United States Patent
Sato et al.

(10) Patent No.: US 7,578,880 B2
(45) Date of Patent: Aug. 25, 2009

(54) METHOD OF PRODUCING FINE PARTICLES OF METAL COMPLEX PIGMENT AND DISPERSION CONTAINING FINE PARTICLES OF METAL COMPLEX PIGMENT OBTAINED BY THE METHOD

(75) Inventors: Tadahisa Sato, Kanagawa-ken (JP); Jun Tanabe, Kanagawa-ken (JP); Hideki Maeta, Kanagawa-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 368 days.

(21) Appl. No.: 11/514,848

(22) Filed: Sep. 5, 2006

(65) Prior Publication Data

US 2007/0056471 A1 Mar. 15, 2007

(30) Foreign Application Priority Data

Sep. 6, 2005 (JP) ............................. 2005-258382
Sep. 4, 2006 (JP) ............................. 2006-238892

(51) Int. Cl.
*C09B 67/10* (2006.01)
*C09B 67/00* (2006.01)
*C09B 67/12* (2006.01)
*C08K 5/00* (2006.01)

(52) U.S. Cl. ................. 106/493; 106/410; 106/411; 106/412; 106/413; 106/494; 106/496; 534/692; 540/122; 540/140; 556/33

(58) Field of Classification Search ............... 106/410, 106/411, 412, 413, 493, 494, 496; 534/692; 540/122, 140; 556/33
See application file for complete search history.

(56) References Cited

U.S. PATENT DOCUMENTS

| 4,197,242 | A | 4/1980 | Gunther | |
| 7,160,380 | B2 * | 1/2007 | Maeta et al. | 106/493 |
| 7,192,477 | B2 * | 3/2007 | Nakanishi et al. | 106/412 |
| 7,427,322 | B2 * | 9/2008 | Maeta et al. | 106/493 |
| 7,427,323 | B1 * | 9/2008 | Birau et al. | 106/497 |
| 7,427,324 | B1 * | 9/2008 | Birau et al. | 106/497 |
| 2006/0090697 | A1 * | 5/2006 | Teshima et al. | 118/610 |
| 2006/0260510 | A1 * | 11/2006 | Maeta et al. | 106/493 |
| 2007/0119336 | A1 * | 5/2007 | Nakahama et al. | 106/31.6 |

FOREIGN PATENT DOCUMENTS

| JP | 61-190562 A | 8/1986 |
| JP | 6-79168 A | 3/1994 |
| JP | 2002-155221 A | 5/2002 |
| JP | 2004-91560 A | 3/2004 |

* cited by examiner

*Primary Examiner*—Anthony J Green
(74) *Attorney, Agent, or Firm*—Birch, Stewart, Kolasch & Birch

(57) ABSTRACT

A method of producing fine particles of metal complex pigment, containing the step of reacting a solution of an alkali metal salt of a ligand that constitutes the metal complex with a solution of salts of a metal that constitutes the metal complex, in the course of a laminar flow in a channel; and a method of producing fine particles of metal complex pigment, containing the step of bringing a solution of an alkali metal salt of a ligand that constitutes the metal complex and a solution of salts of a metal that constitutes the metal complex into contact with each other in a channel having an equivalent diameter of 1 mm or less to form a liquid flow.

18 Claims, 4 Drawing Sheets

METHOD OF PRODUCING FINE PARTICLES OF METAL COMPLEX PIGMENT AND DISPERSION CONTAINING FINE PARTICLES OF METAL COMPLEX PIGMENT OBTAINED BY THE METHOD

FIELD OF THE INVENTION

The present invention relates to a method of producing fine particles of metal complex pigment. Particularly, the present invention relates to a method of producing fine particles of metal complex pigment, which method comprises reacting a solution of an alkali metal salt of a ligand that constitutes the metal complex with a solution of salts of a metal that constitutes the metal complex, by bringing the two into contact with each other in a passage (channel), to produce pigment fine particles. The present invention also relates to a dispersion containing the fine particles of metal complex pigment obtained by the above method.

BACKGROUND OF THE INVENTION

Metal complex pigments are excellent in heat resistance and weather resistance, hence they have attained increased importance in recent years. Conventionally, metal phthalocyanine compounds, which are typical metal complex pigments, are very useful as pigments in the field of coloring material industries, and many investigations have been conducted on such compounds for a long time. Phthalocyanine pigments can exhibit vivid color tone and high coloring (tinctorial) power, and they are widely used as cyan colorants in many fields. Examples of use applications in which the pigments are used include paints, printing inks, electrophotographic toners, ink-jet inks, and color filters. The pigments are important compounds indispensable in everyday life at the present time. Practically particularly important applications of phthalocyanine pigments as color materials (colorants), which need to have high performance in particular, include pigments for inkjet inks or color filters.

As the coloring material for ink-jet ink, dyes have been used, but they have drawbacks as to water resistance and light resistance. To overcome the drawbacks, pigments have come to be used. As cyan pigments, use may be mainly made of copper phthalocyanine pigments. Images obtained from pigment inks have remarkable advantages of superior light resistance and water resistance compared with images obtained from dye-based inks. However, the former images have the problems that the pigment is not easily formed uniformly or pulverized into fine-particles of a nanometer size, which can permeate pores in the surface of paper, and then the pigment in the image is poor in contact or adherence property to the paper.

With an increase in the number of pixels in digital cameras, there is a need for a color filter used in a CCD sensor to be made thinner. Some color filters use organic pigments (for example, metal complex pigments, such as copper phthalocyanine compounds as cyan pigments and nickel azo compounds as yellow pigments are used). Since the thickness of the filter depends largely on the particle diameter of the organic pigment, there has been a need to produce stable fine-particles of a nanometer-size level.

In some fields other than the field of coloring material industries, phthalocyanine compounds (fine particles) are used in such fields in which semiconductivity or photoconductivity of the compounds are utilized. For example, investigations have been conducted on electrophotographic photoconductors or laser printer photoconductors, based on the photoconductivity of metal-free phthalocyanines, or a variety of metal phthalocyanines, such as copper phthalocyanine, vanadyl oxyphthalocyanine, aluminum chlorophthalocyanine, zinc phthalocyanine, hydroxygallium phthalocyanine, and titanyl phthalocyanine.

Some types of metal phthalocyanines have redox power, and thus attention has focused on their application to catalysts. Since phthalocyanine compounds have multiple functions as mentioned above, not only metal-free or copper phthalocyanines but also various types of metal phthalocyanines, especially fine particles thereof, are increasing in importance (see "Pigment Dispersion and Stabilization and Surface Treatment Techniques and Evaluation," 2001, pp. 123-224, published by Technical Information Institute Co., Ltd., Japan; and Masato Tanaka and Shouji Korna, "Phthalocyanines: Their Basic Physical Properties and Application to Functional Materials," 1991, pp. 55-124, published by Bun-Shin, Japan).

In general, the methods to produce pigment fine particles are roughly classified into the breakdown method, in which fine particles are produced from a bulk material by pulverization or the like, and the build-up method, in which fine particles are produced by particle-growth from a gas phase or liquid phase (see "Experimental Chemical Lecture, $4^{th}$ Edition," edited by the Chemical Society of Japan (Maruzen Co., Ltd.), vol. 12, pp. 411-488, 1993). The pulverizing method, which has been widely used hitherto, is a fine-particle-producing method having high practicability, but it has various problems, such as that its productivity is very low in producing pigment particles of nanometer size, and that the materials to which the method can be applied are limited. In recent years, investigations have been made to produce pigment fine-particles of nanometer size by the build-up method.

As one of the build-up method, a method called a reprecipitation method is proposed (see JP-A-6-79168 ("JP-A" means unexamined published Japanese patent application)). The reprecipitation method produces fine particles of an organic material by bringing a solution of an organic material dissolved in a good solvent, into contact with its poor solvent, to precipitate fine particles of the organic material. This method is effective as an efficient method of producing particles of nanometer size. However, it is difficult to find good solvents for pigments that are basically sparingly soluble in solvents, and it is therefore difficult to synthesize desired pigment fine particles at a high concentration. A method has been recently studied in which an amide-type solvent is used as a good solvent, to obtain pigment fine particles (see JP-A-2004-91560). However, the concentration of the fine particles of a metal phthalocyanine, which is a metal complex pigment obtained by the method, is considerably low, and therefore there is need for development of a new method.

As another method, a method, in which fine particles are produced using a micro-jet reactor in an acid-paste method that has been used for refining a metal phthalocyanine, is known (see JP-A-2002-155221). The acid-paste method comprises the steps of: dissolving a crude reaction product in a strong acid (generally concentrated sulfuric acid), with the benefit of high solubility of copper phthalocyanine or the like in a strong acid; and pouring the resulting solution into ice water, to precipitate particles. However, in this method, a highly oxidizing acid is used, and therefore, new decomposable impurities, which causes a degradation of the performance of the product for use in electronic materials, catalysts, or the like, become mixed in the solution, although their amount is very small (see P. A. Barrett, D. A. Frye, R. P. Linstead, "J. Chem. Soc.," 1938, 1157). This problem cannot be solved by using a micro-jet reactor, and therefore, further improvement in the method is desired.

As to a method of producing a metal complex, for example, a metal phthalocyanine, there is an indirect synthetic method using an alkali metal phthalocyanine as a synthetic precursor. This method comprises the steps of: first, synthesizing an alkali metal phthalocyanine that is highly pure and relatively easy to dissolve in an organic solvent; dissolving or dispersing it in an organic solvent; and allowing it to react with salts of transition metals, such as copper, dissolved or dispersed in an organic solvent, to precipitate a transition metal phthalocyanine. This method use either (i) dilithium phthalocyanine or (ii) dipotassium phthalocyanine. These methods are further described in below.

(i) Metal-free phthalocyanines are also hardly soluble compounds in organic solvents, although they have slightly better solubility in an organic solvent than a phthalocyanine of a transition metal, such as copper. When alkali metal phthalocyanines are brought into contact with a solvent having acidity (for example, water or an alcohol), they are converted into hardly soluble metal-free phthalocyanines, and precipitated resultantly. Among the alkali metal phthalocyanines, however, dilithium phthalocyanine is relatively stable and soluble in absolute ethanol. Based on such properties, dilithium phthalocyanine can be used in the synthesis of transition metal phthalocyanines, through reaction with transition metal salts in absolute ethanol (see P. A. Barrett, D. A. Frye, R. P. Linstead, "J. Chem. Soc.," 1938, 1157).

Actually, however, it is too much to say that dilithium phthalocyanine is easily soluble. Specifically, because the reaction does not proceed in a uniform solution; rather, in actually, it converts dilithium phthalocyanine dispersed in a liquid into metal phthalocyanine, and considerable time is required to complete the reaction. Therefore, the reaction with alcohol (solvent) is suppressed in an environment where the reaction with the transition metal ion is fast. If the reaction time becomes longer because of scaling up or the like, however, metal-free phthalocyanine by-products can be obtained in some cases.

(ii) In alcohols, dipotassium phthalocyanine is rapidly converted into metal-free phthalocyanine. In alcohols, therefore, it cannot be reacted with a transition metal salt. A method in which dipotassium phthalocyanine is allowed to react with a transition metal salt in a hydroxyl-free organic solvent is proposed (see JP-A-61-190562). A method of purifying metal-free phthalocyanine, which comprises the step of: heating dipotassium phthalocyanine together with an ether-series solvent, such as a crown ether or diglyme, dimethyl sulfoxide, and dimethylformamide, so as to form a soluble complex has been studied (U.S. Pat. No. 4,197,242). By combining the aforementioned methods, and based on the method using diglyme, a method of synthesizing a metal phthalocyanine, which comprises the steps of: preparing a solution of a dipotassium phthalocyanine bis(methoxyethyl)ether complex, and allowing it to react with transition metal salts has been thought. However, in this method, dipotassium phthalocyanine is uniformly dissolved, but the transition metal salts are dispersed in diglyme. Eventually, this method is a reaction using a dispersed material, and, in this point, this method is the same as the method described in (i).

As mentioned above, the above indirect synthetic method, in which the alkali metal phthalocyanine is reacted with the transition metal salt, is a reaction in which one of these compounds is in a nonuniformly dispersed state. It is therefore difficult to use this method for synthesis serving to attain particle size control at the same time. There has been no example of studies that disclose the production of fine particles to control particle sizes by using this synthesis method.

SUMMARY OF THE INVENTION

The present invention resides in a method of producing fine particles of metal complex pigment, comprising the step of reacting a solution of an alkali metal salt of a ligand that constitutes the metal complex with a solution of salts of a metal that constitutes the metal complex, in the course of a laminar flow in a channel.

Further, the present invention resides in a method of producing fine particles of metal complex pigment, comprising the step of bringing a solution of an alkali metal salt of a ligand that constitutes the metal complex and a solution of salts of a metal that constitutes the metal complex into contact with each other in a channel having an equivalent diameter of 1 mm or less to form a liquid flow.

Other and further features and advantages of the invention will appear more fully from the following description, taken in connection with the accompanying drawings.

BRIEF DESCRIPTION OF THE DRAWINGS

FIG. 1-2 is a sectional view taken on line I-I of FIG. 1-1.

FIG. 2-1 is a typical explanatory view of a reactor having a cylindrical tube-type channel in which a channel is provided to insert at one side thereof.

FIG. 2-2 is a sectional view taken on line IIa-IIa of FIG. 2-1.

FIG. 2-3 is a sectional view taken on line IIb-IIb of FIG. 2-1.

FIG. 3-1 is a typical explanatory view of a reactor having on both sides thereof Y-shaped channels.

FIG. 3-2 is a sectional view taken on line III-III of FIG. 3-1.

Figure 1:
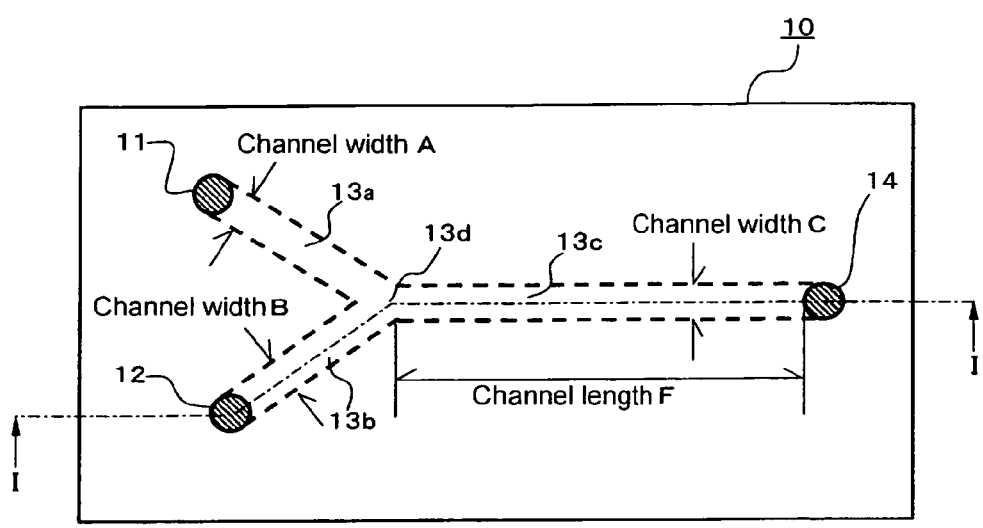
FIG. 1-1 is a typical explanatory view of a reactor having on one side thereof a Y-shaped channel.

The letters or numerals used in the above-described drawings are described below.

| | |
|---|---|
| 10, 20, 30 and 40 | Reactor |
| 11, 12, 21, 22, 31, 32, 41 and 42 | Introducing port |
| 13, 33 | Channel |
| 13a, 13b, 23a, 23b, 33a, 33b, 43a and 43b | Introducing channel |
| 13c, 23c, 33c and 43c | Reaction channel |
| 13d, 23d, 33d and 43d | Fluid confluence point |
| 33e and 43e | Fluid diverging point |
| 33f, 33g, 43f and 43g | Discharge channel |
| 14, 24, 34, 35, 44 and 45 | Discharge port |

DETAILED DESCRIPTION OF THE INVENTION

According to the present invention, there is provided the following means:

(1) A method of producing fine particles of metal complex pigment, comprising the step of reacting a solution of an alkali metal salt of a ligand that constitutes the metal complex with a solution of salts of a metal that constitutes the metal complex, in the course of a laminar flow in a channel;

(2) The method of producing fine particles of metal complex pigment according to the above item (1), wherein the solvent for the solution of an alkali metal salt is a polar solvent;

(3) The method of producing fine particles of metal complex pigment according to the above item (1) or (2), wherein the alkali metal salt is a sodium salt or a potassium salt;

(4) The method of producing fine particles of metal complex pigment according to any one of the above items (1) to (3), wherein the salt of the metal is a metal halide and/or a metal acetylacetonate;

(5) The method of producing fine particles of metal complex pigment according to any one of the above items (1) to (4), wherein the metal is a transition metal;

(6) The method of producing fine particles of metal complex pigment according to any one of the above items (1) to (5), wherein the salt of the metal is copper bromide;

(7) The method of producing fine particles of metal complex pigment according to any one of the above items (1) to (6), wherein at least one dispersing agent is dissolved in any one or both of the solution of an alkali metal salt and the solution of salts of a metal;

(8) The method of producing fine particles of metal complex pigment according to above item (7), wherein the dispersing agent is a low-molecular-weight dispersing agent and/or a polymer dispersing agent;

(9) The method of producing fine particles of metal complex pigment according to any one of the above items (1) to (8), wherein an equivalent diameter of the channel is 1 mm or less;

(10) The method of producing fine particles of metal complex pigment according to any one of the above items (1) to (9), wherein the metal complex pigment is a metal phthalocyanine;

(11) A dispersion comprising the fine particles of metal complex pigment produced by the producing method according to any one of the above items (1) to (10);

(12) A method of producing fine particles of metal complex pigment, comprising the step of bringing a solution of an alkali metal salt of a ligand that constitutes the metal complex and a solution of salts of a metal that constitutes the metal complex into contact with each other in a channel having an equivalent diameter of 1 mm or less to form a liquid flow;

(13) The method of producing fine particles of metal complex pigment according to the above item (12), wherein the salt of the metal is copper bromide; and

(14) The method of producing fine particles of metal complex pigment according to the above item (12) or (13), wherein the metal complex pigment is a metal phthalocyanine.

The inventors of the present invention have found, in production of fine particles of a metal complex pigment, by a method comprising: preparing a solution of an alkali metal salt of a ligand that constitutes the metal complex (hereinafter also simply referred to as an "alkali metal salt solution"), preparing a solution of salts of a metal that constitutes the metal complex (hereinafter also simply referred to as "metal salts solution"), which solution is to be reacted with the alkali metal salt solution, and reacting these solutions, in a liquid flow course, in a passage (channel), fine particles of metal complex pigment having a small particle size and a narrow distribution of particle size can be produced.

The present invention will be explained in detail.

Metal complex pigments that can be prepared by the producing method of the present invention are pigments formed when an alkali metal salt of an organic molecule that becomes the ligand in the complex undergoes complex formation reaction with a metal ion derived from salts of a metal. Metal complex pigments are roughly classified, by the kinds of ligand, into, for example, metal phthalocyanine pigments, azo metal complex pigments, and azomethine metal complex pigments. Specific examples, when shown by C. I. numbers, include metal phthalocyanine pigments, such as P.B. 15, P.B. 75, P.B. 79, P.G. 7, and P.G. 36; azo metal complex pigments, such as P.G. 8, P.G. 10, and P.Y. 150; and azomethine metal complex pigments, such as P.Y. 65, P.Y. 117, P.Y. 129, P.Y. 153, P.Y. 177, P.Y. 179, P.O. 65, P.O. 68, and P.R. 257. Among the metal complex pigments, preferred are metal phthalocyanine pigments. In the following, the producing method of the present invention will be explained in detail, mostly taking metal phthalocyanine pigments as examples, but the present invention should not be construed as being limited to these.

Examples of the center metal of the metal complex in the producing method of the present invention include a II-, III- or IV-valent typical metal, transition metal, or inner transition metal. Specific examples thereof include typical metals, such as aluminum (Al), silicon (Si), gallium (Ga), germanium (Ge), arsenic (As), indium (In), tin (Sn), antimony (Sb), thallium (Ti), and lead (Pb); transition metals, such as scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au) and mercury (Hg); and lanthanide type or actinide type inner transition metals, such as cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), thorium (Th), protactinium (Pa), uranium (U), neptunium (Np) and americium (Am). Among these metals, transition metals are preferable, and copper (Cu) is more preferable.

In the producing method of the present invention, the ligand (e.g. phthalocyanine group in the case of metal phthalocyanine) may have a substituent. The substituent is preferably an alkyl or cycloalkyl group having 1 to 6 carbon atoms, an aryl group having 6 to 10 carbon atoms, an alkoxy group having 1 to 6 carbon atoms or a halogen atom, such as chlorine or bromine, and more preferably an unsubstituted or halogen atom-substituted group. The metal phthalocyanine is particularly preferably unsubstituted. Herein, in the present invention, the term "metal phthalocyanine" is used to mean those having a phthalocyanine skeleton and those having a structure (e.g. naphthalocyanine) in which a benzene ring is further condensed with the benzene ring of the phthalocyanine skeleton.

The alkali metal salt used in the producing method of the present invention is preferably a phthalocyanine alkali metal salt and it usually forms a dialkali metal salt. Examples of an alkali metal thereof include lithium (Li), sodium (Na), potassium (K), rubidium (Rb) and cesium (Cs). Sodium (Na), potassium (K), rubidium (Rb) or cesium (Cs) is preferable, sodium (Na) or potassium (K) is more preferable, and a sodium (Na) is further preferable.

The salts of a metal used in the producing method of the present invention are salts of a metal constituting a pigment when the metal is used as the center metal of the metal complex. As the metal, metals explained in relation to the above center metal of the metal complex are given as examples and the preferable range is also the same. Examples of the counter anion forming the salts include a halogen anion, $ClO_4^-$, $BF_4^-$, carboxylic acid ion (for example, acetic acid ion), sulfonic acid ion (for example, methanesulfonic acid ion) and phosphoric acid ion. Among these, the counter anion is preferably an anion, such as a halogen anion and an acetylacetonate anion, constituting a ligand forming a complex that is not so resistant to metals; more preferably a halogen ion, such as a chlorine ion and a bromine ion, or an acetylacetonate anion; and particularly preferably a bromine ion constituting a metal salt which is highly soluble in a polar solvent. Also, it is preferable to add a trialkylphosphine (for example, tributylphosphine), trialkylphosphite (for example, triethylphosphite and tributylphosphite) or the like for the purpose of improving the solubility of the salts of a metal.

In the producing method of the present invention, the solvent for the alkali metal salt solution is preferably a polar solvent (a solvent having a large polarization structure in its molecule). Specifically, as the solvent, a solvent containing, as a major component, a sulfur-containing polar organic solvent, such as dimethylsulfoxide, sulfolane and 3-sulfolene, or an amide type organic solvent, such as N,N-dimethylformamide, N,N-dimethylacetamide, N-methylpyrrolidone and 1,3-dimethyl-2-imidazolidinone, is preferable. When the solvent is a polar organic solvent, 50% or more (volumetric ratio) of the solvent is preferably a polar organic solvent, and the solvent may be used in combinations of other organic solvent or water. It is preferable to use dimethylsulfoxide singly or a mixture of dimethylsulfoxide, or sulfolane singly or a mixture of sulfolane; and it is more preferable to use dimethylsulfoxide (DMSO) singly or a mixture of dimethylsulfoxide.

When mixing with a polar solvent, examples of the other organic solvent include an aprotic solvent, and specifically, polyether-type solvents, such as ethylene glycol dimethyl ether (monoglyme), diethylene glycol dimethyl ether (diglyme) and triethylene glycol dimethyl ether (triglyme); ketone-type solvents, such as acetone and methyl ethyl ketone; and urea-type solvents, such as tetramethylurea. Among these solvents, polyether-type solvents are preferable. These solvents may be used either singly or in combinations of two or more.

A solvent (for example, water and alcohols) having a group that tends to impart a proton, such as a hydroxyl group, generally reacts with an alkali metal phthalocyanine to give a metal-free phthalocyanine, when it is used to dissolve a phthalocyanine alkali metal salt, and is therefore undesirably used as a mixed solvent. However, because when an excess alkali is contained in the solution, the equilibrium is shifted largely to the alkali metal phthalocyanine side, a proton-donating solvent may be present in a little amount (preferably 20 mass % or less and more preferably 10 mass % or less) without any problem.

The polar solvent may be contained only in an amount necessary to dissolve the alkali metal to obtain high-purity fine particles of metal complex pigment. The amount of the polar solvent (in the case of a mixed solvent, the total amount of the mixed solvent) is preferably about 5 to 200 times, and more preferably about 10 to 100 times the amount of the alkali metal salt in terms of mass ratio.

Though there is no particular limitation to a method of preparing the alkali metal salts solution, (i) alkali metal salts having a desired ligand (for example, phthalocyanine alkali metal salts such as disodium phthalocyanine) may be dissolved in a polar solvent (for example, DMSO) or (ii) a compound to be converted into a desired ligand (for example, a metal-free phthalocyanine) and an alkali compound (for example, sodium hydroxide and sodium methoxide) may be separately dissolved in a polar solvent (for example, DMSO).

In the producing method of the present invention, the solvent that dissolves the salts of a metal is preferably dimethylsulfoxide (DMSO), N,N-dimethylacetamide, N-methylpyrrolidone, diglyme, triglyme or acetone, and particularly preferably DMSO. The solvent used to dissolve the salts of a metal may be contained only in an amount necessary to dissolve the salts of a metal. The amount of the solvent (in the case of a mixed solvent, the total amount of the mixed solvent) is preferably about 5 to 200 times, and more preferably about 10 to 100 times the amount of the salts of a metal in terms of mass ratio.

It is preferable to add at least one dispersing agent in both or one of the alkali metal salt solution and the metal salts solution. The addition of the dispersing agent is preferable to obtain pigment fine particles having narrower particle diameter distribution and a small size. The dispersing agent has a function (1) that the dispersing agent is rapidly adsorbed on the surface of precipitated organic fine particles, to form fine particles, and (2) that these particles are prevented from aggregating again. As the dispersing agent, use can be made of an anionic, cationic, amphoteric, nonionic or pigmentary and low-molecular-weight or polymer dispersing agent. These dispersing agents may be used alone or in combination.

Examples of the anionic dispersing agent (anionic surfactant) include N-acyl-N-methyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates and polyoxyethylenealkylsulfates. Among these compounds, N-acyl-N-methyltaurine salts and polyoxyethylenealkylsulfates are preferable. Also, the cation forming the salts is preferably an alkali metal cation. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amines and aliphatic alcohols, imidazolines derived from aliphatic acids, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agent (nonionic surfactant) include polyoxyethylene alkyl ethers, polyoxyethylene alkyl aryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a pigmentary dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Specific examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymers, partial-formal products of polyvinyl alcohol, partial-butyral products of polyvinyl alcohol, vinylpyrrolidone/vinyl acetate copolymers, polyethylene oxide/propylene oxide block copolymers, polyacrylic acid salts, polyvinyl sulfuric acid salts, poly(4-vinylpyridine) salts, polyamides, polyallylamine salts, condensed naphthalene-sulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, tragacanth gum, and ligninsulfonic acid salts. Polyvinyl pyrrolidone is particularly preferable. These polymer dispersing agents may be used alone or in combination of two or more thereof In a preferred embodiment for the addition of the dispersing agent, for example, the dispersing agent is added to the alkali metal salt solution. In a particularly preferred embodiment, the anionic dispersing agent and/or the polymer dispersing agent are added to the alkali metal salt solution and no dispersing agent is added to the metal salts solution.

The amount of the dispersing agent to be blended is preferably from 0.1 to 500 parts by mass, more preferably from 1 to 200 parts by mass, to 100 parts by mass of the alkali metal salt, to further improve uniform dispersibility and storage stability of the pigment. If the amount of the dispersing agent to be added is too small, the dispersion stability of the pigment fine-particles may not be improved, in some cases.

Next, the passage (channel) used in the producing method according to the present invention is described in detail.

First, the equivalent diameter is described hereinafter. It is a term also called a corresponding diameter, which is used in mechanical engineering field. If a cylindrical pipe equivalent to the pipe (passage in the present invention) having any sectional shape is assumed, the diameter of the equivalent cylindrical pipe corresponds to the equivalent diameter. The equivalent diameter ($d_{eq}$) is defined as $d_{eq}=4A/p$ in which A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a); $d_{eq}=a/\sqrt{3}$ in an equilateral triangular pipe having a side (a); and $d_{eq}=2h$ in a flow between paralleled plates having a channel height (h) (see, for example, edited by the Japan Society of Mechanical Engineers, "Kikai Kougaku Jiten," 1997, published by Maruzen, K. K.).

When causing water to flow into a pipe, and inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re=D<v_x>\rho/\mu$$

wherein D represents the equivalent diameter of the pipe, $<v_x>$ represents the sectional average velocity, $\rho$ represents the density of the flow, and $\mu$ represents the viscosity of the flow. As can be understood from this equation, the Reynolds number is smaller as the equivalent diameter is smaller. Therefore, in the case that the equivalent diameter is in the order of $\mu m$, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values are criteria:

Re<2,300 laminar flow;

Re>3,000 turbulent flow; and 3,000≧Re≧2,300 transition state.

As the equivalent diameter of a passage is smaller, the surface area per unit volume (specific surface area) thereof is larger. When the channel turns into a micro-scale, the specific surface area becomes remarkably large so that the conduction efficiency of heat through the wall of the passage becomes very high. Since the heat conduction time (t) of a fluid flowing in the passage is represented by: $t=d_{eq}^2/\alpha$ (in which $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high.

The reaction apparatus (reactor) having such a micro-scale size flow path (channel), which can be used in the producing method of the present invention, is commonly called "microreactor" and is being developed greatly in recent years. The micro-reactor is provided with plural micro-channels each having an equivalent diameter (obtained by converting the section thereof to a corresponding circle) of several micrometers to several hundred micrometers; and a mixing space connected to these micro-channels. In the micro-reactor, plural solutions are introduced through the plural micro-channels into the mixing space, thereby mixing the solutions, or mixing the solutions and simultaneously causing chemical reaction.

Next, the following describes major different points of reaction by use of the micro-reactor from a reaction based on a batch type by use of a tank or the like. In a chemical reaction in a liquid phase, molecules generally encounter each other on the interface between the reaction solutions, to cause the reaction. Therefore, when the reaction is conducted in a microscopic space (micro-channel), the area of the interface is relatively increased so that the efficiency of the reaction increases remarkably. In addition, about the diffusion of molecules, the diffusion time is in proportion with the square of diffusion distance. This fact means that as the scale is made smaller, the mixing of the reaction solutions advances more by the diffusion of the molecules, so as to cause the reaction more easily even if the reaction solutions are not actively mixed. Further, in the microscopic space, because the scale is small, the flows tend to turn preferentially to laminar flows. Therefore, the solutions are put into a laminar flow state and are diffused into each other, enabling more exact mixing than in the case of the batch system.

When a micro-reactor, which has characteristics as described above, is used, the reaction time and temperature between the solutions therein can be more precisely controlled, compared with a conventional batch system, in which, for example, a tank having a large volume is used as a reaction site. Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there may be a possibility that the resultant product becomes non-homogeneous or coagulation and precipitation are caused in the mixing container. Contrary to the above, according to the micro-reactor, solutions hardly remain in the mixing space (e.g. a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it becomes difficult that crystals aggregate or precipitation in the mixing space.

Further, when a chemical substance that can be produced in only a small amount by use of an experimental producing-apparatus, is tried to produce in a large amount by use of large-scale manufacturing facilities (i.e. scaling up), huge labor and very long time have been required hitherto, to gain the reproducibility of the manufacture in large-scale manufacturing facilities of a batch system as similar as the reproducibility of the production in the experimental producing-apparatus. However, by arranging a plurality of producing lines each using a micro-reactor in parallel according to a necessary production quantity, labor and time for gaining such the reproducibility may be largely reduced.

With respect to the forming method of the passage, it is relatively easy to form a passage with an equivalent diameter of 1 mm or more with generally known machine processing techniques, but it is exceptionally difficult to form a passage with a micro size, such as 1 mm or less, (micro passage), especially with a size of 500 μm or less. A micro-size passage (micro-passage) is formed on a solid substrate by micro processing technique in many cases. The material of the substrate may be any stable material that is not apt to be corroded. Examples of the material include metal (e.g. stainless steel, hastelloy (Ni—Fe based alloy), nickel, aluminum, silver, gold, platinum, tantalum, and titanium), glass, plastics, silicone, Teflon (registered trademark), and ceramics.

Representative examples of the micro processing technique for producing the micro-passage include a LIGA (Roentgen-Lithographie Galvanik Abformung) method using X-ray lithography, a high aspect ratio photolithography method using EPON SU-8 (trade name), a micro discharge processing method (μ-EDM (Micro Electro Discharge Machining)), a high aspect ratio processing method for silicon by Deep RIE (Reactive Ion Etching), a hot emboss processing method, a photo-fabrication method, a laser processing method, an ion beam processing method, and a mechanical micro cutting processing method using a micro tool made of such a hard material as diamond. These techniques may be used alone or in combination. Preferable micro processing techniques are the LIGA method using X-ray lithography, the high-aspect ratio photolithography method using EPON SU-8, the micro discharge processing method (μ-EDM), and the mechanical micro cutting processing method. In recent years, investigations have been made for applying a micro-injection molding technique to engineering plastics.

When the micro passage is assembled, a joining technique is often used. A normal joining technique is roughly divided into solid-phase joining and liquid-phase joining. In joining methods generally used, a typical joining method includes pressure welding and diffusion bonding as the solid-phase joining; and welding, eutectic bonding, soldering, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such a technique includes a silicon direct joining, anode joining, surface activation joining, direct joining using hydrogen bond, joining using aqueous HF solution, Au—Si eutectic bonding, and void-free bonding.

In the producing method of the present invention, the equivalent diameter of the passage used to carry out the reaction is preferably 10 mm or less, more preferably 1 mm or less, still more preferably 10 μm to 1 mm and particularly preferably 20 to 300 μm, and the passage is preferably one that forms a laminar flow when two liquids are allowed to flow. Though no particular limitation is imposed on the length of the passage, it is preferably 1 mm or more and 10 m or less, more preferably 5 mm or more and 10 m or less, and particularly preferably 10 mm or more and 5 m or less.

In the producing method of the present invention, the preparations of the fine particles of metal complex pigment and the dispersion of these fine particles are preferably carried out while starting materials flow in the passage, namely, by a continuous flow method.

The number of passages that can be used in the producing method of the present invention may be any number appropriately provided with a reactor. The number of channels may be one. Alternately, many channels may be arranged in parallel (i.e. numbering-up) as needed, to increase a processing amount.

The passage is not limited to a passage formed on a solid substrate by use of the micro processing technique, and may be, for example, various available fused silica capillary tubes or glass capillaries each having an inner diameter of several micrometers to several hundred micrometers. Various silicon tubes, fluorine-containing resin tubes, stainless steel pipes, and PEEK (polyetheretherketone) pipes each having an inner diameter of several micrometers to several hundred micrometers, which are commercially available as parts for high-performance liquid chromatography or gas chromatography, can also be used.

Hitherto, with respect to the micro-reactors, devices that are aimed to improve reaction efficiency and the like, have been reported. For example, JP-A-2003-210960, JP-A-2003-210963 and JP-A-2003-210959 are concerned with micro-mixers. In the present invention, these micro-devices may also be used.

The passage may be subjected to a surface treatment according to an object. In particular, when handling an aqueous solution, since the adsorption of a sample to glass or silicon may become a problem, the surface treatment is preferably carried out. In the fluid control in the micro-sized flow passage, it is preferable to realize this without incorporating a movable part requiring a complicated manufacturing process. For example, a hydrophilic region and a hydrophobic region are prepared in the passage by the surface treatment, so that it becomes possible to treat a fluid by using a difference in surface tension exerting on the boundary between these regions. The method used for surface-treating glass or silicon in many cases is preferably hydrophobic or hydrophilic surface-treatment by using a silane coupling agent.

It is preferable to carry out the operation of introducing and mixing a reagent, a sample or the like under a fluid control. Because, particularly, the behavior of the fluid in a micro-passage has properties different from those in the case of a macro-scale passage, it is preferable to adopt a control system suitable for the micro-scale passage. The fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the micro-passage is filled with a fluid, and the fluid as a whole is driven by a pressure source such as a syringe pump that is provided outside the channel. In this method, although there is such a difficulty that dead volume is large, and the like, the continuous flow system has such a great merit that the control system can be realized with a relatively simple set-up.

As a system which is different from the continuous flow system, there is provided the droplet (liquid plug) system. In this system, droplets partitioned by air are made to move inside the reactor or inside the passage leading to the reactor, and each of the droplets is driven by air pressure. During this process, a vent structure for allowing air between droplets and passage walls, or air between the droplets as necessary, to escape to the outside; a valve structure for maintaining pressure inside the branched passages independently from pressure at other portions; and the like, must be provided inside the reactor system. Further, a pressure control system comprising a pressure source or a switching valve must be provided outside the reactor system in order to move the droplets by controlling the pressure difference. Thus, in the droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved; and a pressure driving method in which a pressure is applied to a fluid from the outside of the passage using a pressure source to move the fluid. It has been known that both systems are different in that, for example, as the behavior of the fluid, the flow velocity profile in the cross-section of the flow passage becomes a flat distribution in the case of the electrical driving system, whereas it becomes a hyperbolic flow distribution in the pressure driving system, in which the flow velocity is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the substrate (component) hardly exists, and its application range is wide. On the contrary, a pressure source must be prepared outside, and for example, response characteristics to manipulation are changed according to the magnitude of a dead volume of a pressure system, and it is necessary to automate the complicated process.

Although a method to be used as a fluid control method is suitably selected according to its object, the pressure driving system of the continuous flow system is preferable.

The temperature control in the passage may be performed by putting the whole reactor having a passage in a container in which the temperature is controlled; or forming a heater structure made of a metal resistance wire, polysilicon or the like in the reactor, and performing a thermal cycle in such a manner that the heater structure is used when heating, and cooling is natural cooling. With respect to the sensing of temperature, when the metal resistance wire is used, it is preferable that the same resistance wire as the heater is additionally formed, and the temperature detection is performed on the basis of the change of the resistance value of the additional wire. When the polysilicon is used, it is preferable that a thermocouple is used to detect the temperature. Further, heating and cooling may be performed from the outside by bringing a Peltier element into contact with the passage. A suitable method is selected in accordance with the use, the material of the passage body, and the like.

Figure 4:
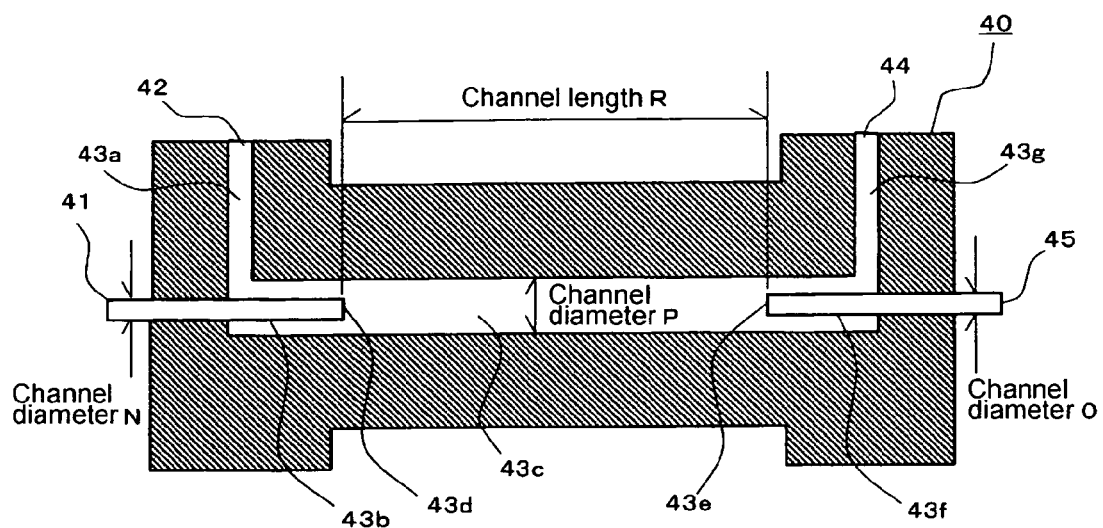
FIG. 4 is a typical explanatory view of a reactor having a cylindrical tube-type channel in which channels are provided to insert at both sides thereof.

Examples of the structure of a single passage reactor provided with a passage which is preferably used in the producing method of the present invention are shown typically in FIG. 1-1 to FIG. 4. However, the present invention is not construed to be limited to these examples.

Figures 1, 2:
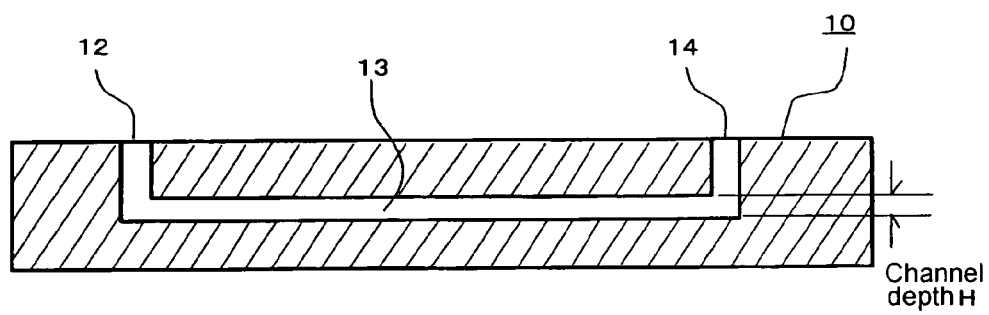

FIG. 1-1 is an explanatory view typically showing a reactor (10) having a Y-shaped channel. FIG. 1-2 is a sectional view taken on I-I line of FIG. 1-1. The shape of the section perpendicular to the direction of the length of the channel is varied dependently on the micro processing technique to be used, and is a shape close to a trapezoid or a rectangle. When widths and depths (in particular, width C and depth H) of the Y-shaped channel are made into micro-sizes, solutions introduced from introducing ports 11 and 12 with pumps or the like are caused to flow via introducing channels 13a or 13b, respectively, and are brought into contact with each other at a fluid confluence point 13d to form stable laminar flows to flow through a reaction channel 13c. While the solutions flow as the laminar flows, a solute contained in the laminar flow is mixed or reacted with another solute contained in another laminar flow each other by molecular diffusion on the interface between the laminar flows. Solutes, which diffuse very slowly, may not be diffused or mixed between the laminar flows; and, in some cases, the solutes are not mixed until they reach a discharge port 14. In such a case that the two solutions to be introduced are easily mixed in a flask, the flow of the mixed solutions may become homogeneous flow in the discharge port if a channel length F is made long. However, when the channel length F is short, laminar flows are kept up to the discharge port. When the two solutions to be introduced are not mixed in a flask and are separated into phases, the two solutions naturally flow as laminar flows to reach the discharge port 14.

Figures 1, 2:
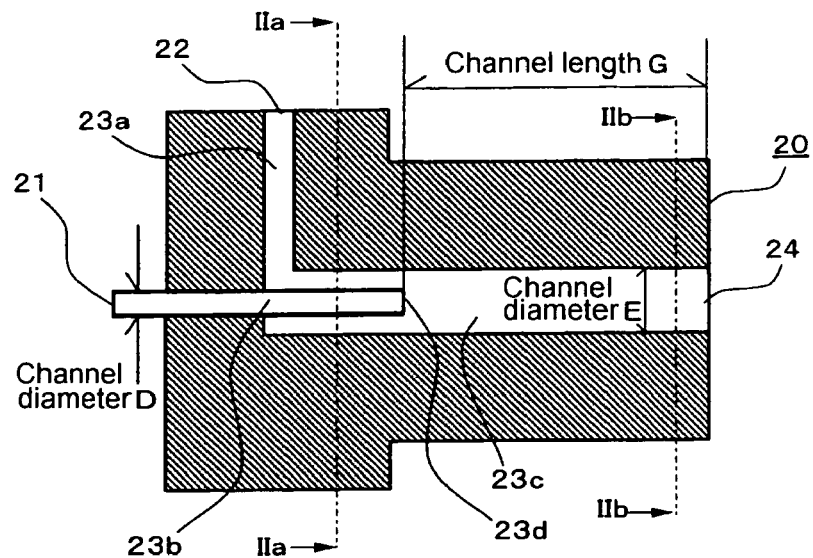
Figure 2:
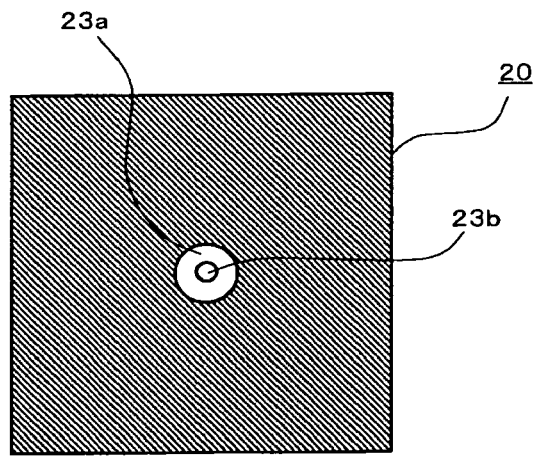
Figures 2, 3:
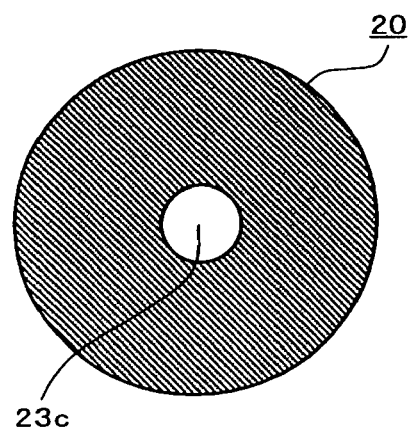
Figures 1, 3:
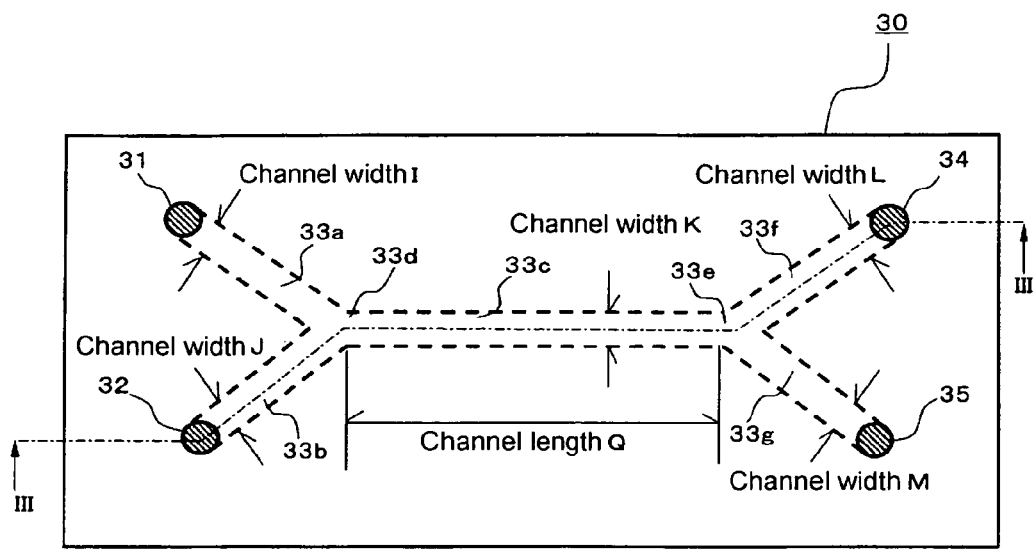
Figures 2, 3:
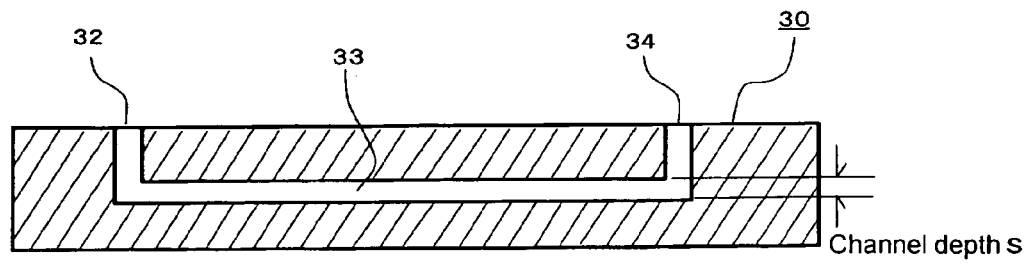

FIG. 2-1 is an explanatory view typically showing a reactor (20) having a cylindrical pipe-type channel in which a channel is inserted at one side thereof. FIG. 2-2 is a sectional view of the reactor taken on line IIa-IIa of FIG. 2-1, and FIG. 2-3 is a sectional view of the reactor taken on line IIb-IIb of FIG. 2-1. The shape of the section perpendicular to the direction of the length of the channel is a circular shape or a shape close thereto. When the channel diameters (D and E) of the cylindrical pipes are micro-sizes, solutions introduced from introducing ports 21 and 22 with pumps or the like are caused to flow via introducing channels 23b or 23a, respectively, and are brought into contact with each other at a fluid confluence point 23d to form stable cylindrical laminar flows to flow through a reaction channel 23c. While the solutions flow as the cylindrical laminar flows, solutes contained in the respective laminar flows are mixed or reacted with each other by molecular diffusion on the interface between the laminar flows. This matter is the same as in the case of the reactor, as illustrated in FIG. 1-1. The apparatus having the cylindrical pipe-type channels has the following characteristics: that the apparatus can make the contact interface between the two solutions larger than the apparatus illustrated in FIG. 1-1; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is blocked.

FIGS. 3-1 and 4 illustrate apparatuses obtained by improving the apparatuses illustrated in FIGS. 1-1 and 2-1, respectively, in order that when flows of two solutions arrive at outlets in the state that the flows are laminar flows, the laminar flows can be separated. When these apparatuses are used, reaction and separation can be attained at the same time. It is also possible to avoid phenomena that the two solutions are finally mixed so that the reaction between the solutions advances excessively, and that generated fine particles get coarse. In the case that products or crystals are selectively present in one of the solutions, the products or crystals can be obtained with a higher concentration than in the case that the two solutions are mixed. Further, by linking a plurality of the apparatuses to each other, there are such advantages that it is possible to carry out a purifying process of the produced fine-particles.

In the producing method of the present invention, solutions homogeneously dissolving the alkali metal salt and the salts of a metal, respectively, are introduced into the channel. When a suspension liquid is introduced into the channel, the size of the particles therein becomes large or fine-particles having a wide particle size distribution are generated. This results, as the case may be, to be apt to block the channel. The wording "homogeneously dissolving" means a solution in which turbidity (muddiness) is hardly observed when the solution is visually observed under visible light. In the present invention, a solution obtained by filtration through a microfilter having pores of 1 μm or less in diameter, or a solution which does not contain any substance remaining after the solution is filtrated through a filter having pores of 1 μm or less in diameter, is generally defined as a homogeneously dissolved solution (or a homogeneous solution).

In the producing method of the present invention, the alkali metal salt solution and the solution of the salts of a metal are reacted with each other in a passage to produce the fine particles of metal complex pigment. The reaction is carried out using a passage provided with at least two introducing ports as shown in FIG. 1-1 and FIG. 2-1. Specifically, the alkali metal salt solution is introduced into the introducing port 11 shown in FIG. 1-1 or the introducing port 21 shown in FIG. 2-1, and the metal salts solution is introduced into the introducing port 12 shown in FIG. 1-1 or the introducing port 22 shown in FIG. 2-1. Both the solutions are brought into contact with each other in the channel 13c or 23c to form liquid flows (e.g. laminar flows), thereby synthesizing fine particles of metal complex pigment. Because the Reynold's number of each of the solutions is small in the case where the equivalent diameter of the channel is a micro-scale, the solutions form stable laminar flows (cylindrical laminar flows in FIG. 2-1) and the solutes in both laminar flows are migrated by diffusion through the stable boundary between both solutions to generate a metal complex gradually. In this case, metal phthalocyanines are sparingly soluble in a solvent system used in a reaction and there are therefore many cases where they are gradually precipitated as fine particles.

The fine particles of metal complex pigment produced in the micro-scale passage flow to the discharge port without being diffused while they are kept in one laminar flow by controlling the conditions such as the width of the channel, flow rate, concentrations of the reaction liquids and reaction temperature. Therefore, when a channel reactor provided with the discharge ports designed as shown in FIG. 3-1 or FIG. 4 is used, a laminar flow containing the pigment fine particles can be separated. It is advantageous to use this method because not only a concentrated dispersion of the pigment fine particles can be obtained but also an excess dispersing agent and the like can be removed. Also, the formation of bulky fine particles and the change of the particle structure of a pigment, which may be caused by mixing both liquids finally, can be prevented.

In the producing method of the present invention, the reaction temperature in the passage is preferably −20 to 90° C., more preferably 0 to 50° C., and particularly preferably 5 to 30° C., though no particular limitation is imposed on it insofar as it is in a range where a solvent to be used is neither solidified nor vaporized under the working pressure.

In the producing method of the present invention, the flow velocity (flow rate) of the fluid which flows in the channel is preferably from 0.1 mL/hour to 300 L/hour, more preferably from 0.2 mL/hour to 30 L/hour, further preferably from 0.5 mL/hour to 15 L/hour, and particularly preferably from 1.0 mL/hour to 6 L/hour.

In the measuring method of fine particles, the average size of the group of the particles can be expressed by a numerical value. Examples of the numerical value which is widely used, include mode diameter, which shows the maximum value of the particle size distribution; medium diameter, which corresponds to the central value of the integration distribution curve thereof; and various average diameters (such as length average diameter, volume average diameter, area average diameter, weight average diameter and number average diameter). In the present invention, the term "particle diameter" refers to the volume average diameter, unless otherwise stated. In the present invention, the particle diameter of the pigment fine particles is preferably 1 μm or less, and more preferably 3 nm to 800 nm in terms of the volume average diameter (MV), though it is optional insofar as the passage is not clogged.

There is polydispersity as an index showing that the particle sizes of the fine particles are even, specifically as an index showing the monodispersibility of the fine particles. The polydispersity is obtained by dividing the volume average diameter (MV) by the number average molecular diameter (MN). If this MV/MN value is close to 1, this shows a very sharp distribution (so-called monodispersion), whereas if the value is large, this shows a wide distribution. The pigment fine particles produced by the producing method of the present invention have a MV/MN value of preferably 1.2 to 2.5 and more preferably 1.2 to 1.6.

In the case where the fine particles of metal complex pigment obtained by the reaction are sparingly soluble in a solvent after the reaction is completed, the fine particles coagulate to generate precipitates when the reaction liquid is taken in a collector bottle from the discharge port of the micro-reactor and allowed to stand. These precipitates may be isolated and purified by filtration and washing. In other words, the precipitates obtained by the reaction is collected by filtration, washed with the used polar solvent, and further washed sufficiently with a solvent, such as acetone, that has a low boiling point and can be mixed sufficiently with the polar solvent, to remove the polar solvent, followed by drying by a vacuum pump to obtain a coagulate of fine particles of metal complex pigment as a solid. The drying may be carried out under heating.

When the coagulate of the pigment fine particles synthesized in the presence of at least one dispersing agent is poured into water (preferably containing a surfactant in a low concentration), and irradiated with ultrasonic wave or thoroughly stirred, they are dispersed finely in water whereby a highly transmittable water dispersion can be provided.

On the other hand, when the liquid containing the fine particles of metal complex pigment obtained by the reaction is taken directly in a collector bottle containing excess water from the discharge port of the micro-reactor and allowed to stand, it becomes a slightly cloudy liquid at the start but becomes a highly transmittable dispersion of the metal complex fine particles gradually. In this case, though the aforementioned ultrasonic irradiation or stirring promotes the dispersion, these processes are not always required to obtain a highly transmittable dispersion. In order to obtain a dispersion having a high concentration, it is effective to subject the obtained water dispersion to thin-film concentration or ultrafiltration. The ultrafiltration makes it possible to isolate the pigment fine particles in the form of a solid or paste form.

The present invention can solve the problem in the method of synthesizing metal complex pigments, especially metal phthalocyanine fine particles, according to the conventional build-up method. That is, the present invention can provide a method of producing pigment fine particles that are reduced in size and that have a sharp peak of particle diameter distribution; and a dispersion containing the pigment fine particles obtained by the method. Further, the present invention can provide a method which can obtain metal complex pigments, as fine particles with a controlled particle size; and a dispersion containing the pigment fine particles obtained by the method.

According to the method of producing fine particles of metal complex pigment of the present invention, because it is possible to carry out a reaction under exact control of temperature, reaction time and the like in the reaction condition of a homogeneous liquid system, it is possible to produce fine particles of metal complex pigment having even particle diameter and a sharp peak of particle diameter distribution. Further, it is possible to produce pigment fine particles with a controlled particle size. Also, according to the method of producing fine particles of metal complex pigment of the present invention, the aforementioned excellent fine particles of metal complex pigment can be easily produced, and enable increasing production scale and making it possible to spread the application of use of the fine particles of metal complex pigment and a dispersion containing the pigment fine particles.

The present invention will be described in more detail based on the following examples, but the invention is not intended to be limited thereto.

EXAMPLES

In the examples and the comparative examples, average particle diameters (MV and MN) were measured using a dynamic light scattering particle diameter analyzer (Microtrack UPA 150 (trade name), manufactured by Nikkiso Co., Ltd.). Measurement of a purity of the metal phthalocyanines was conducted by taking a resultant metal phthalocyanine, followed by washing and then sufficiently drying, then dissolving the dried product in 95% concentrated sulfuric acid to measure UV absorption, and comparing the resultant absorbance with that of a standard at the same wavelength. In the examples and comparative examples, the pigment fine particles were produced at room temperature (about 27° C.), unless otherwise noted.

Reaction Liquids (A) to (D) used in the examples and the comparative examples were prepared in the following manner. The liquids each were a homogeneous liquid. After preparation, each liquid was filtered through a 0.5 μm PTFE (polytetrafluoroethylene) microfilter (manufactured by Advantech Company) before use. Abbreviations are used for the following chemical compounds.

| | |
|---|---|
| 2NaPC | Disodium phthalocyanine (manufactured by Tokyo Kasei Kogyo Co., Ltd.) |
| 2HPC | Metal-free phthalocyanine (manufactured by Tokyo Kasei Kogyo Co., Ltd.) |
| DMSO | Dimethylsulfoxide |
| PVP | Polyvinyl pyrrolidone (polymer dispersing agent, manufactured by Tokyo Kasei Kogyo Co., Ltd., molecular weight: 40,000) |
| SOT | N-oleoyl-N-methyltaurine sodium salt (surfactant) |
| SDS | Sodium dodecylsulfate (surfactant) |
| Liquid (A-1) | Bluish green liquid of 0.5 mass % 2NaPC which was obtained by dissolving 2.5 g (4.5 mmol) of 2NaPC in DMSO, to be 500 g. |
| Liquid (A-2) | Bluish green liquid of 1.0 mass % 2HPC which was obtained by dissolving 5.0 g (9.7 mmol) of 2HPC in DMSO using 11.7 ml of 1 mol/L NaOH, to be 500 g. |
| Liquid (A-3) | Bluish green liquid of 1.0 mass % 2HPC which was obtained by dissolving 5.0 g (9.7 mmol) of 2HPC in DMSO using 7.3 g of 28% CH$_3$ONa methanol solution, to be 500 g. |
| Liquid (B) | Colorless transparent liquid of 10.0 mass % PVP which was obtained by dissolving 5.0 g of PVP in DMSO, to be 50 g. |

-continued

| | |
|---|---|
| Liquid (C-1) | Colorless transparent liquid of 1 mass % SOT which was obtained by dissolving 5.0 g (11.7 mmol) of SOT in DMSO, to be 500 g. |
| Liquid (C-2) | Colorless transparent liquid of 10.0 mass % SDS which was obtained by dissolving 5.0 g (17.3 mmol) of SDS in DMSO, to be 50 g. |
| Liquid (D) | Brown liquid of 20 mass % $CuBr_2$ which was obtained by dissolving 10.0 g (44.8 mmol) of $CuBr_2$ in DMSO at room temperature with stirring, to be 500 g. |

Example 1

In the reactor provided with a Y-shaped passage as shown in FIG. 1 produced from glass having the following structure: passage width A: 100 μm, passage width B: 100 μm, passage width C: 100 μm, passage length F: 12 cm and passage depth H: 40 μm, two Teflon (registered trademark) tubes were connected with the introducing ports 11 and 12 using a connector. A syringe containing a mixture liquid of the liquid (A-1), the liquid (B) and the liquid (C-1) (mass ratio: 20:1:10) was connected with the Teflon (registered trademark) tube of the introducing port 11, and a syringe containing only the liquid (D) was connected with the Teflon (registered trademark) tube of the introducing port 12, each syringe being set to a syringe pump. A Teflon (registered trademark) tube was also connected to the discharge port 14 by using a connector. When the mixture liquid was fed from the introducing port 11 at a feed rate of 20 μL/min and the liquid (D) was fed from the introducing port 12 at a feed rate of 10 μL/min, it was observed that both liquids were brought into contact with each other at the point 13d and formed laminar flows, and copper phthalocyanine pigment fine particles were gradually produced at the contact interface in the passage 13c.

The produced fine particles were discharged from the discharge port 14 without clogging the passage and collected in a flask from the end of the connected Teflon (registered trademark) tube. After 8 hours, the feedings of the liquids were stopped and the collected liquid was allowed to stand overnight. Then, the collected reaction liquid was subjected to filtration using 0.1 μm PTFE filter. The DMSO layer which was the filtrate had a pale yellow color and was not contaminated with blue compounds at all. The resulting blue materials and the PTFE filter to which the blue materials were stuck were taken into a flask, and 30 ml of an aqueous 0.1 mass % SOT solution was added to the flask. After ultrasonic wave was applied to the liquid for 10 minutes (using a ultrasonic washing machine operated in 30 W and oscillation frequency of 45 kHz), the liquid was stirred by a stirrer for one hour. When the resulting liquid was allowed to pass through a 0.45 μm CE filter (manufactured by SARTORIUS K. K.), almost all the blue materials were migrated to the filtrate and there was hardly any substance filtered. The particle diameter of the substances contained in the filtrate was measured, to find that MV value was 50.5 nm and MN value was 36.1 nm (MV/MN=1.40). In order to find the purity of the resulting water-soluble pigment fine particles, a part of the blue substances obtained by filtration using a 0.1 μm PTFE filter was dissolved in concentrated sulfuric acid to measure UV absorption. As a result, the presence of metal-free phthalocyanine could not be confirmed and almost all the blue substances were copper phthalocyanine.

Comparative Example 1

4.8 ml of the liquid (D) in an eggplant-shape flask was vigorously stirred and 9.6 ml of a mixture liquid of the liquid (A-1), the liquid (B) and the liquid (C-1) (mass ratio: 20:1:10) was added dropwise to the flask over 8 hours using a syringe pump. Then, the resulting liquid was allowed to stand overnight and the obtained precipitates were subjected to filtration using 0.1 μm PTFE filter. The DMSO layer which was the filtrate had a pale yellow color and was not contaminated with blue compounds at all. The resulting blue materials and the PTFE filter to which the blue materials were stuck were taken into a flask, and 30 ml of an aqueous 0.1 mass % SOT solution was added to the flask. After ultrasonic wave was applied to the liquid for 10 minutes (using an ultrasonic washing machine operated in 30 W and oscillation frequency of 45 kHz), the liquid was stirred by a stirrer for one hour. When the resulting liquid was allowed to pass through a 0.45 μm CE filter, almost all the blue materials were migrated to the filtrate and there were only a small amount of filtered materials. The particle diameter of the substances contained in the filtrate was measured, to find that MV value was 78.5 nm and MN value was 43.6 nm (MV/MN=1.80). In order to find the purity of the resulting water-soluble pigment fine particles, a part of the blue substances obtained by filtration using a 0.1 μm PTFE filter was dissolved in concentrated sulfuric acid to measure UV absorption. As a result, the presence of metal-free phthalocyanine could not be confirmed and almost all the blue substances were copper phthalocyanine.

As the results of the Example 1 and the Comparative Example 1, it is found that the fine particles of copper phthalocyanine pigment produced by the producing method of the present invention in the course of a liquid flow in a passage have small particle diameters and a narrow distribution of particle diameter.

Example 2

In the reactor provided with a cylindrical passage as shown in FIG. 2 having the following structure: passage diameter D: 100 μm, passage diameter E: 400 μm and passage length G: 20 cm, two Teflon (registered trademark) tubes were connected with introducing ports 21 and 22 by using a connector. A syringe containing a mixture liquid of the liquid (A-2), the liquid (B) and the liquid (C-2) (mass ratio: 10:1:1) was connected with the Teflon (registered trademark) tube of the introducing port 21, and a syringe containing only the liquid (D) was connected with the Teflon (registered trademark) tube of the introducing port 22, each syringe being set to a syringe pump. When the mixture liquid was fed from the introducing port 21 at a feed rate of 1.0 mL/h, and the liquid (D) was fed from the introducing port 22 at a feed rate of 2.0 mL/h, both liquids were brought into contact with each other at the point 23d and formed cylindrical laminar flows in the passage 23c, and copper phthalocyanine pigment fine particles were produced in the center layer.

The produced fine particles were discharged from the discharge port 24 without clogging the passage and collected in a flask containing 50 ml of water from the connected Teflon (registered trademark) tube. After 5 hours, the feedings of the liquids were stopped and the collected liquid was allowed to stand overnight. The collected liquid was a blue liquid having high transparency. The collected liquid was concentrated using a stirring type ultra-folder to which an ultrafiltration membrane made of polysulfone having a fractional molecular weight of 200000 was set. The liquid was washed with water repeatedly to remove excess low-molecular compounds (e.g. SDS and CuBr$_2$) almost completely and a large part of excess PVP, to obtain a paste-like copper phthalocyanine pigment. When this paste was taken into 30 ml of water and the mixture was stirred, a transparent dispersion was obtained even if ultrasonic wave was not applied. The particle diameter of the substances contained in the dispersion was measured, to find that MV value was 35.4 nm and MN value was 26.2 nm (MV/MN=1.35). The obtained paste was dissolved in concentrated sulfuric acid in the same manner as in Example 1 to measure UV absorption. As a result, the presence of metal-free phthalocyanine could not be confirmed.

Comparative Example 2

10.0 ml of the liquid (D) in an eggplant-shape flask was vigorously stirred and 5.0 ml of a mixture liquid of the liquid (A-2), the liquid (B) and the liquid (C-2) (mass ratio: 10:1:1) was added dropwise to the flask over 5 hours using a syringe pump. Then, the resulting liquid was allowed to stand overnight and the obtained precipitates were subjected to filtration using 0.1 μm PTFE filter. The DMSO layer which was the filtrate had a pale yellow color and was not contaminated with blue compounds at all. The resulting blue materials and the PTFE filter to which the blue materials were stuck were taken into a flask, and 50 ml of an aqueous 0.1 mass % SDS solution was added to the flask. After ultrasonic wave was applied to the liquid for 10 minutes (using an ultrasonic washing machine operated in 30 W and oscillation frequency of 45 kHz), the liquid was stirred by a stirrer for one hour. When the resulting liquid was allowed to pass through a 0.45 μm CE filter, almost all the blue substances were migrated to the filtrate and there were only a small amount of filtered materials. The particle diameter of the substances contained in the filtrate was measured, to find that MV value was 69.5 nm and MN value was 40.6 nm (MV/MN=1.71). In order to find the purity of the resulting water-soluble pigment fine particles, a part of the blue substances obtained by filtration using a 0.1 μm PTFE filter was dissolved in concentrated sulfuric acid to measure UV absorption. As a result, the presence of metal-free phthalocyanine could not be confirmed and almost all the blue substances were copper phthalocyanine.

As the results of the Example 2 and the Comparative Example 2, it is also found that the fine particles of copper phthalocyanine pigment prepared by the producing method of the present invention are superior because they have small particle diameter and sharp distribution peak of the particle diameter.

Example 3

A simple modification of the device having the Y-shaped passage shown in FIG. 1 was used, wherein two Teflon (registered trademark) tubes having a length of 50 cm and an equivalent diameter of 1 mm were connected with two introducing ports of a Teflon (registered trademark) Y-shaped connector having an equivalent diameter of 500 μm through connectors respectively. A syringe was connected with the end of each tube and set to a syringe pump. A Teflon (registered trademark) tube having a length of 1 m and an equivalent diameter of 500 μm was connected with the discharge port of the Y-shaped connector. When a liquid containing the (A-2) liquid was fed at a feed rate of 1.0 mL/min and the liquid (D) was fed at a feed rate of 2.0 mL/h from each introducing port, it was found that copper phthalocyanine pigment fine particles were produced in the Y-shaped connector and the Teflon (registered trademark) tube connected to the discharge port. Materials collected from the end of the Teflon (registered trademark) tube were treated in the same procedures as in Example 1 to obtain water dispersion. The particle diameter of the substances contained in the dispersion was measured, to find that MV value was 60.3 nm and MN value was 40.2 nm (MV/MN=1.50). The purity was measured in the same manner as in Example 1, to find that the presence of metal-free phthalocyanine was not almost confirmed.

Comparative Example 3

The same procedures as in Example 3 were conducted except that all the equivalent diameters of the Teflon (registered trademark) Y-shaped connector and the Teflon (registered trademark) tubes connected to the Teflon (registered trademark) Y-shaped connector were altered to 2.0 mm. When a liquid containing the (A-2) liquid was fed at a feed rate of 4.0 mL/min and the liquid (D) was fed at a feed rate of 8.0 mL/min from each introducing port, it was found that copper phthalocyanine pigment fine particles were produced in the connector and the Teflon (registered trademark) tube connected to the discharge port. Materials collected from the end of the Teflon (registered trademark) tube were treated in the same procedures as in Example 1 to obtain water dispersion. The particle diameter of the substances contained in the dispersion was measured, to find that MV value was 270.3 nm and MN value was 110.2 nm (MV/MN=2.45). The purity was measured in the same manner as in Example 1, to find that metal-free phthalocyanine was contained in a negligible quantity.

As the results of the Example 3 and the Comparative Example 3, it is found that the particle size of the fine particles can be controlled by regulating the diameter of the passage, thereby giving desired pigment fine particles which are fine and even.

Example 4

In the reactor provided with a cylindrical passage as shown in FIG. 2 having the following structure: passage diameter D: 100 μm, passage diameter E: 400 μm and passage length G: 20 cm, two Teflon (registered trademark) tubes were connected with introducing ports 21 and 22 by using a connector. A syringe containing a mixture liquid of the liquid (A-3) and the liquid (C-2) (mass ratio: 10:1) was connected with the Teflon (registered trademark) tube of the introducing port 21, and a syringe containing only the liquid (D) was connected with the Teflon (registered trademark) tube of the introducing port 22, each syringe being set to a syringe pump. When the mixture liquid was fed from the introducing port 21 at a feed rate of 1.0 mL/h, and the liquid (D) was fed from the introducing port 22 at a feed rate of 2.0 mL/h, both liquids were brought into contact with each other at the point 23d and formed cylindrical laminar flows in the passage 23c, and copper phthalocyanine pigment fine particles were produced in the center layer.

The produced fine particles were discharged from the discharge port 24 without clogging the passage and collected in a flask containing 50 ml of water from the connected Teflon (registered trademark) tube. After 5 hours, the feedings of the liquids were stopped and the collected liquid was allowed to stand overnight. The collected liquid was a blue liquid having high transparency. The collected liquid was concentrated using a stirring type ultra-folder to which an ultrafiltration membrane made of polysulfone having a fractional molecular weight of 50000 was set. The liquid was washed with water repeatedly to remove excess low-molecular compounds (e.g. SDS and $CuBr_2$) almost completely, to obtain a paste-like copper phthalocyanine pigment. When this paste was taken into 30 ml of water and the mixture was stirred, a transparent dispersion was obtained even if ultrasonic wave was not applied. The particle diameter of the substances contained in the dispersion was measured, to find that NV value was 35.4 nm and MN value was 26.2 nm (MV/MN=1.35). The obtained paste was dissolved in sulfuric acid in the same manner as in Example 1 to measure UV absorption. As a result, the presence of metal-free phthalocyanine could not be confirmed.

Example 5

Using the apparatus used in Example 4, a fine particle dispersion of P. Y. 150 (nickel azobarbiturate complex pigment) was prepared in the following manners.

An azobarbituric acid was synthesized by an ordinary method (e.g. JP-A-2005-272688). Into a flask, 1 g of the thus-prepared azobarbituric acid, 1 g of SOT as a dispersing agent, and 0.1 g of PVP were loaded, and these were dissolved in DMSO and 4 M sodium hydroxide, to obtain a 5 mass % solution. The thus-prepared solution was loaded into a syringe; the syringe was connected with the Teflon (registered trademark) tube of the introducing port 21, and a syringe containing 5 mass % nickel acetate was connected with the Teflon (registered trademark) tube of the introducing port 22. These solutions were fed respectively from the introducing port 21 at a feed rate of 1.0 ml/h and from the introducing port 22 at a feed rate of 5.0 ml/h, and were introduced into a cylindrical laminar flow reaction apparatus heated to 90° C., to give pigment fine particles of nickel azobarbiturate complex. The feeding of the solutions was continued for five hours, and then the liquid of the pigment fine particles produced during this time was collected into a flask containing 30 ml of water and allowed to stand overnight at room temperature. Excess components were removed from the collected liquid with an ultrafiltration membrane in the same manner as in Example 4, to obtain an aqueous dispersion of P. Y. 150 pigment fine particles. The particle diameter of the fine particles contained in the dispersion was measured, to find that MV value was 43.5 nm and MN value was 30.2 nm (MV/MN=1.44).

Having described our invention as related to the present embodiments, it is our intention that the invention not be limited by any of the details of the description, unless otherwise specified, but rather be construed broadly within its spirit and scope as set out in the accompanying claims.

What we claim is:

1. A method of producing fine particles of metal complex pigment, comprising the step of:
    reacting a solution of an alkali metal salt of a ligand that constitutes the metal complex with a solution of salts of a metal that constitutes the metal complex, in a liquid flow course of a laminar flow in a channel filled with a fluid.

2. The method of producing flue particles of metal complex pigment according to claim 1, wherein a solvent for the solution of an alkali metal salt is a polar solvent.

3. The method of producing fine particles of metal complex pigment according to claim 1, wherein the alkali metal salt is a sodium salt or a potassium salt.

4. The method of producing fine particles of metal complex pigment according to claim 1, wherein the salt of the metal is a metal halide and/or a metal acetylacetonate.

5. The method of producing fine particles of metal complex pigment according to claim 1, wherein the metal is a transition metal.

6. The method of producing fine particles of metal complex pigment according to claim 1, wherein the salt of the metal is copper bromide.

7. The method of producing fine particles of metal complex pigment according to claim 1, wherein at least one dispersing agent is dissolved in any one or both of the solution of an alkali metal salt and the solution of salts of a metal.

8. The method of producing fine particles of metal complex pigment according to claim 1, wherein an equivalent diameter of the channel is 1 mm or less.

9. The method of producing fine particles of metal complex pigment according to claim 1, wherein the metal complex pigment is a metal phthalocyanine.

10. The method of producing fine particles of metal complex pigment according to claim 1, wherein a flow velocity of the fluid which flows in the channel is from 0.1 mL/hour to 300 L/hour.

11. The method of producing fine particles of metal complex pigment according to claim 1, wherein a volume average diameter (MV) of the fine particles of metal complex pigment is from 3 nm to 800 nm.

12. The method of producing fine particles of metal complex pigment according to claim 1, wherein a MV/MN value, which is obtained by dividing a volume average diameter by a number average molecular diameter, of the fine particles of metal complex pigment is from 1.2 to 2.5.

13. A method of producing fine particles of metal complex pigment, comprising the step of:
    bringing a solution of an alkali metal salt of a ligand that constitutes the metal complex and a solution of salts of a metal that constitutes the metal complex into contact with each other in a channel filled with a fluid and having an equivalent diameter of 1 mm or less to form a liquid flow.

14. The method of producing fine particles of metal complex pigment according to claim 13, wherein the salt of the metal is copper bromide.

15. The method of producing fine particles of metal complex pigment according to claim 13, wherein the metal complex pigment is a metal phthalocyanine.

16. The method of producing fine particles of metal complex pigment according to claim 13, wherein a flow velocity of the fluid which flows in the channel is from 0.1 mL/hour to 300 L/hour.

17. The method of producing fine particles of metal complex pigment according to claim 13, wherein a volume average diameter (MV) of the fine particles of metal complex pigment is from 3 nm to 800 nm.

18. The method of producing fine particles of metal complex pigment according to claim 13, wherein a MV/MN value, which is obtained by dividing a volume average diameter by a number average molecular diameter, of the fine particles of metal complex pigment is from 1.2 to 2.5.

* * * * *